United States Patent
Lee et al.

(10) Patent No.: US 12,132,687 B2
(45) Date of Patent: Oct. 29, 2024

(54) DEVICE OF HANDLING DETECTION OF A PDCCH

(71) Applicant: ACER INCORPORATED, New Taipei (TW)

(72) Inventors: Chien-Min Lee, New Taipei (TW); Jen-Hsien Chen, New Taipei (TW); Li-Chung Lo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 281 days.

(21) Appl. No.: 17/562,009

(22) Filed: Dec. 27, 2021

(65) Prior Publication Data
US 2022/0224499 A1    Jul. 14, 2022

Related U.S. Application Data

(60) Provisional application No. 63/136,656, filed on Jan. 13, 2021.

(51) Int. Cl.
*H04W 72/23*    (2023.01)
*H04L 5/00*     (2006.01)
*H04W 72/02*    (2009.01)
*H04W 72/044*   (2023.01)

(52) U.S. Cl.
CPC .......... *H04L 5/0098* (2013.01); *H04W 72/02* (2013.01); *H04W 72/044* (2013.01); *H04W 72/23* (2023.01)

(58) Field of Classification Search
None
See application file for complete search history.

(56) References Cited

U.S. PATENT DOCUMENTS

2019/0281594 A1    9/2019  Aiba
2019/0357215 A1    11/2019 Zhou
(Continued)

FOREIGN PATENT DOCUMENTS

KR    10-2020-0088305        7/2020
KR    10-2020-0140745 A     12/2020
(Continued)

OTHER PUBLICATIONS

Moderator (Lenovo), Summary#2 of Email discussion [102-e-NR-unlic-NRU-DL_Signals_and_Channels-02] on Search Space and CSI-RS, 3GPP TSG RAN WG1#102-e, e-Meeting, Aug. 17-28, 2020, R1-2007258, Aug. 2020.
(Continued)

*Primary Examiner* — Minh Trang T Nguyen
(74) *Attorney, Agent, or Firm* — Winston Hsu

(57) ABSTRACT

A communication device for handling detection of a physical downlink (DL) control channel (PDCCH), comprises at least one storage device; and at least one processing circuit, coupled to the at least one storage device. The at least one storage device stores instructions, and the at least one processing circuit is configured to execute the instructions of detecting a PDCCH for a first serving cell of a network according to at least one first search space (SS) set with a first group index; receiving at least one indicator in a DL control information (DCI) from the network; and detecting the PDCCH for the first serving cell of the network according to the at least one indicator, after receiving the DCI, according to one of the proposed instructions.

25 Claims, 16 Drawing Sheets

(56) References Cited

U.S. PATENT DOCUMENTS

| | | | |
|---|---|---|---|
| 2019/0357300 A1 | 11/2019 | Zhou | |
| 2020/0067676 A1* | 2/2020 | Yi | .................... H04W 72/0446 |
| 2020/0229092 A1 | 7/2020 | Wu | |
| 2020/0314671 A1 | 10/2020 | He | |
| 2020/0314898 A1 | 10/2020 | Sun | |
| 2020/0322116 A1 | 10/2020 | Zhou | |
| 2020/0351847 A1 | 11/2020 | Kim | |
| 2020/0367253 A1 | 11/2020 | Kim | |
| 2020/0389874 A1* | 12/2020 | Lin | ...................... H04L 5/0053 |
| 2023/0179342 A1 | 6/2023 | Zhang | |

FOREIGN PATENT DOCUMENTS

| | | |
|---|---|---|
| WO | 2020/198356 A1 | 10/2020 |
| WO | 2020/246858 A1 | 12/2020 |
| WO | 2020/254477 A1 | 12/2020 |

OTHER PUBLICATIONS

Moderator (Lenovo), Feature lead summary for NR-U DL Signals and Channels, 3GPP TSG RAN WG1#102-e, e-Meeting, Aug. 17-28, 2020, R1-2006875, Aug. 2020.

Moderator (Lenovo), Summary of email discussion [100b-e-NR-unlic-NRU- DL_Signals_and_Channels-01] on SS group sets, 3GPP TSG RAN WG1#100bis-e e-Meeting, Apr. 20-30, 2020, R1-2002786, XP051879486.

Moderator (Lenovo), Summary of email discussion [101-e-NR-unlic-NRU- DL_Signals_and_Channels-01] on Search Space, 3GPP TSG RAN WG1#101-e e-Meeting, May 25-Jun. 5, 2020, R1-2004851, XP051892296.

Moderator (Lenovo), Draft TP on search space set group switching, 3GPP TSG RAN WG1#100bis-e e-Meeting, Apr. 20-30, 2020, R1-2003042, XP051879591, Apr. 20, 2022.

Moderator (Lenovo), Summary of Email discussion [102-e-NR-unlic-NRU-DL_Signals_and_Channels-02] on Search Space and CSI-RS, 3GPP TSG RAN WG1#102-e, e-Meeting, Aug. 17-28, 2020, R1-2007144, Aug. 2020.

Media Tek Inc., Summary of Bandwidth Part Remaining Issues, 3GPP TSG RAN WG1 Meeting #94bis, R1-1811955, Chengdu, China, Oct. 8-Oct. 12, 2018 ,Oct. 8, 2018.

Vivo, Discussion on DCI-based power saving adaptation in connected mode, 3GPP TSG RAN WG1#103-e, R1-2007676, e-Meeting, Oct. 26-Nov. 13, 2020 ,Oct. 26, 2020.

OPPO, Remaining issues on scheduling and HARQ, 3GPP TSG RAN WG1 #103-e, R1-2008277, e-Meeting, Oct. 26-Nov. 13, 2020 , Oct. 26, 2020.

* cited by examiner

DEVICE OF HANDLING DETECTION OF A PDCCH

CROSS REFERENCE TO RELATED APPLICATIONS

This application claims the benefit of U.S. Provisional Application No. 63/136,656 filed on Jan. 13, 2021, which is incorporated herein by reference.

BACKGROUND OF THE INVENTION

1. Field of the Invention

The present invention relates to a device used in a wireless communication system, and more particularly, to a device of handling detection of a physical downlink control channel (PDCCH).

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

A LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

Power consumption has been an important issue for a user equipment (UE). Various aspects of the UE has been discussed to reduce the power consumption of the UE, to extend standby/use time of the UE. Different from the proposals in the prior art, detection of a physical downlink (DL) control channel (PDCCH) is improved in the present invention to reduce the power consumption of the UE.

SUMMARY OF THE INVENTION

The present invention therefore provides a device for handling detection of a physical downlink (DL) control channel (PDCCH) to solve the abovementioned problem.

A communication device for handling detection of a physical downlink (DL) control channel (PDCCH), comprises at least one storage device; and at least one processing circuit, coupled to the at least one storage device. The at least one storage device stores instructions, and the at least one processing circuit is configured to execute the instructions of detecting a PDCCH for a first serving cell of a network according to at least one first search space (SS) set with a first group index; receiving at least one indicator in a DL control information (DCI) from the network; and detecting the PDCCH for the first serving cell of the network according to the at least one indicator, after receiving the DCI, according to one of the following instructions: detecting the PDCCH for the first serving cell according to the at least one first SS set with the first group index according to the at least one indicator; detecting the PDCCH for the first serving cell according to at least one second SS set with a second group index according to the at least one indicator; and stopping detecting the PDCCH for the first serving cell according to at least one third SS set for a first time period according to the at least one indicator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
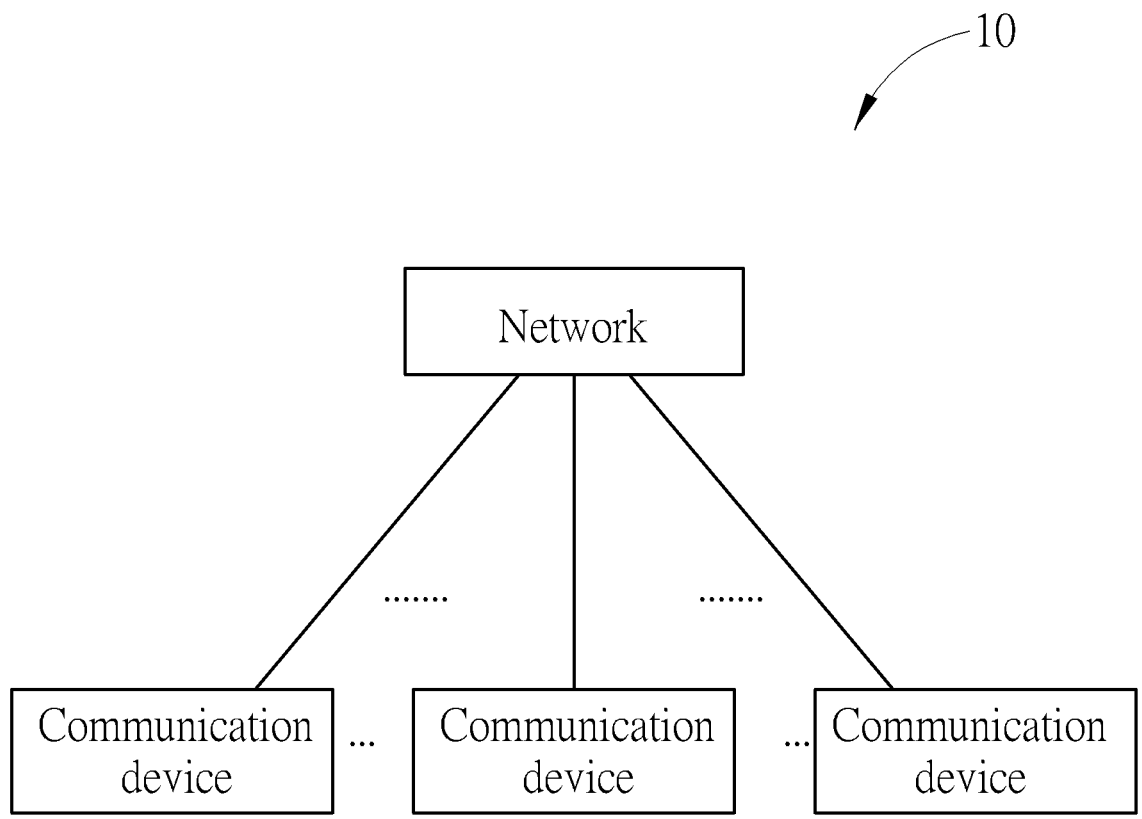
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). In one example, the network may be any BS conforming to a specific communication standard to communicate with a communication device.

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
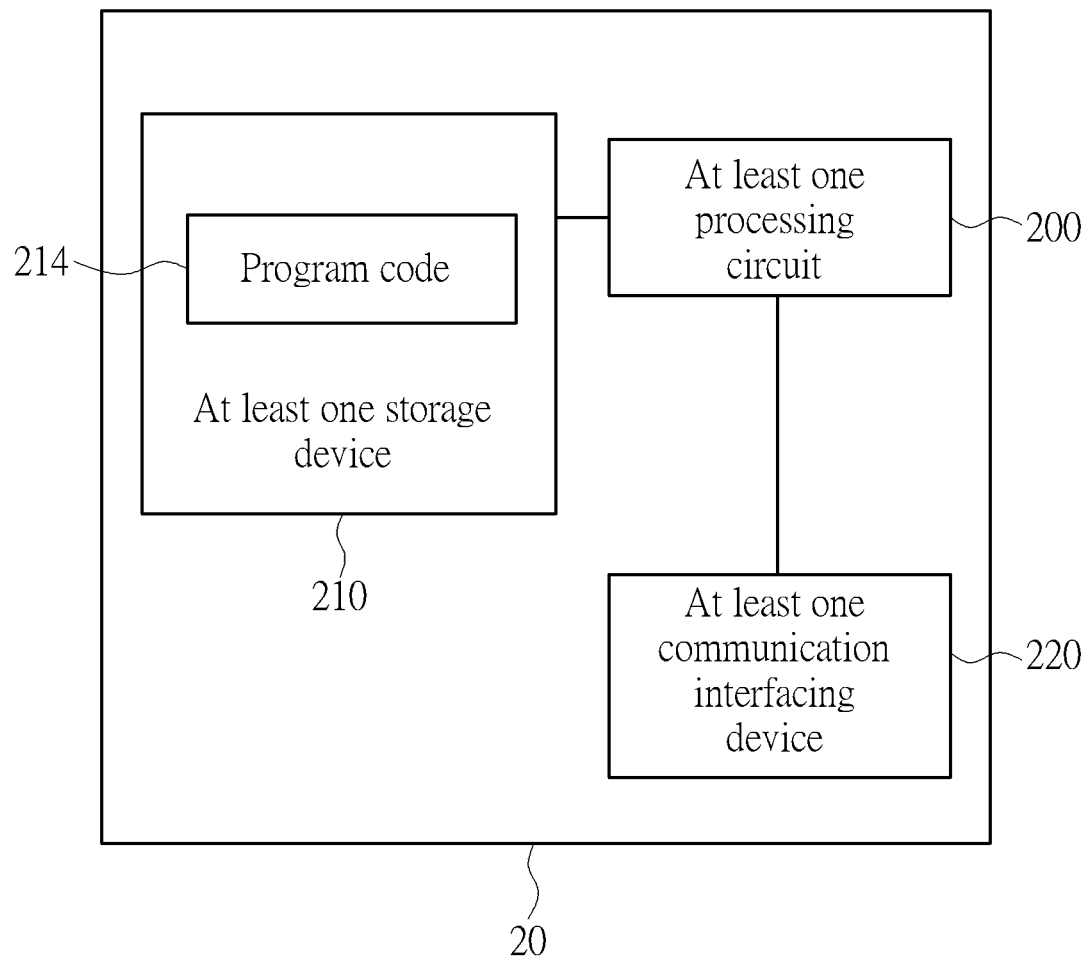
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
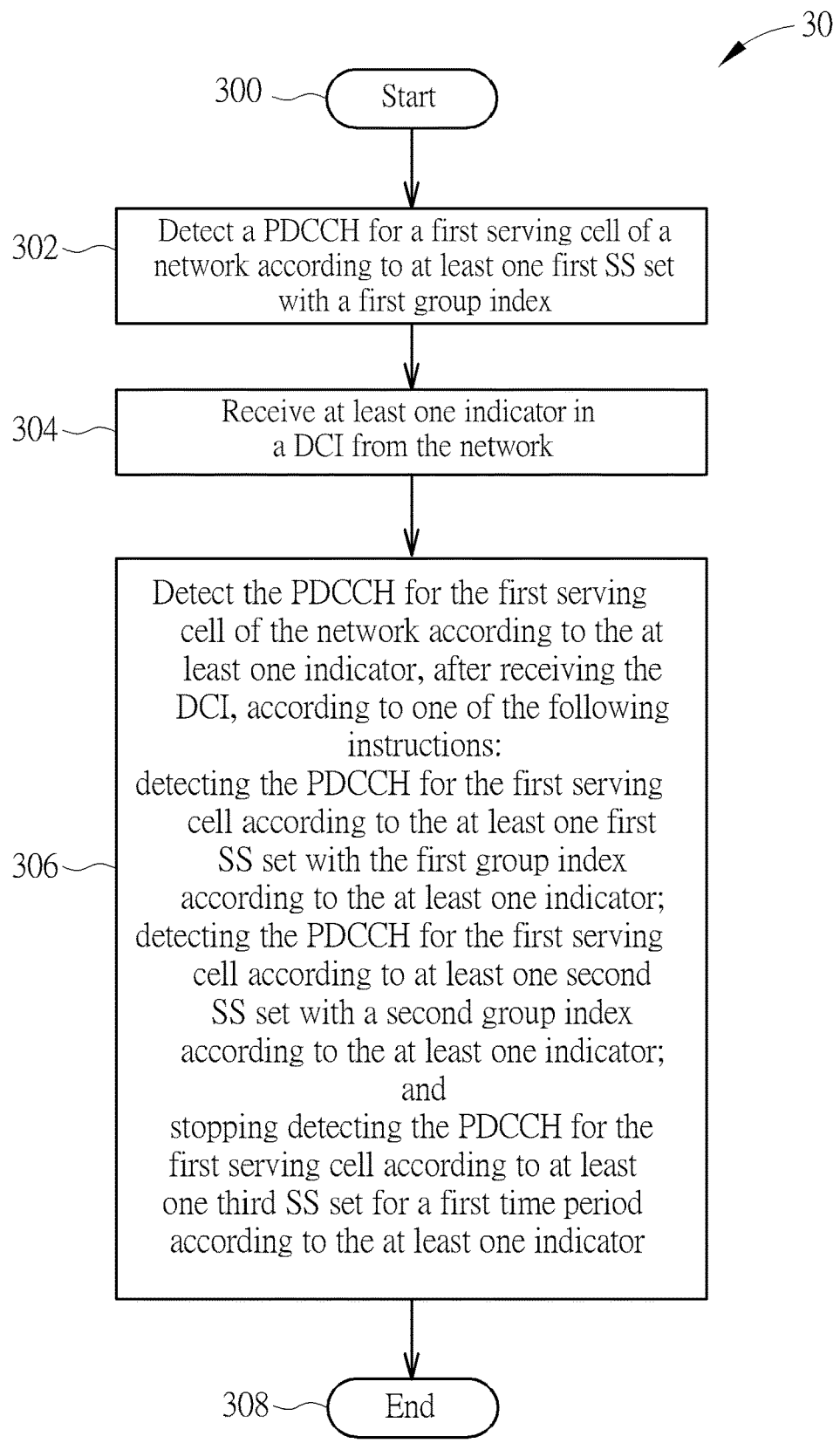
FIG. 3 is a flowchart of a process according to an example of the present invention.

FIG. 3 is a flowchart of a process 30 according to an example of the present invention. The process 30 may be utilized in a communication device, to handle detection of a physical DL control channel (PDCCH). The process 30 may be compiled into the program codes 214 and includes the following steps:

Step 300: Start.

Step 302: Detect a PDCCH for a first serving cell of a network according to at least one first search space (SS) set with a first group index.

Step 304: Receive at least one indicator in a DL control information (DCI) from the network.

Step 306: Detect the PDCCH for the first serving cell of the network according to the at least one indicator, after receiving the DCI, according to one of the following instructions:
  detecting the PDCCH for the first serving cell according to the at least one first SS set with the first group index according to the at least one indicator;
  detecting the PDCCH for the first serving cell according to at least one second SS set with a second group index according to the at least one indicator; and
  stopping detecting the PDCCH for the first serving cell according to at least one third SS set for a first time period according to the at least one indicator.

Step 308: End.

According to the process 30, the communication device detects (e.g., monitors, receives) a PDCCH for a first serving cell of a network according to (e.g., via) at least one first SS set with a first group index. The communication device receives at least one indicator in a DCI from the network (e.g., after detecting the PDCCH). Then, the communication device detects the PDCCH for the first serving cell of the network according to the at least one indicator, after receiving the DCI, according to one of the following instructions: detecting the PDCCH for the first serving cell according to (e.g., via) the at least one first SS set with the first group index according to the at least one indicator; detecting the PDCCH for the first serving cell according to at least one second SS set with a second group index according to the at least one indicator; and stopping detecting the PDCCH for the first serving cell according to at least one third SS set for a first time period according to the at least one indicator. That is, the communication device continues detecting the PDCCH with the same SS set, changes to detect the PDCCH with a different SS set or stops detecting the PDCCH, according to the received indicator. In other words, the PDCCH may be detected according to various numbers of SS sets. Thus, power consumption of the communication device can be controlled adaptively via the at least one indictor. As a result, the problem of the power consumption is solved.

Realization of the process 30 is not limited to the above description. The following examples may be applied for realizing the process 30.

In one example, the communication device stops detecting the PDCCH for the first serving cell according to at least one fourth SS set with another group index, when detecting the PDCCH for the first serving cell according to the at least one first SS set with the first group index according to the at least one indicator.

In one example, the communication device stops detecting the PDCCH for the first serving cell according to at least one fifth SS set with another group index, when detecting the PDCCH for the first serving cell according to the at least one second SS set with the second group index according to the at least one indicator.

In one example, the first time period is configured by a higher layer signal, or is indicated in the DCI. The DCI may be scrambled by a cell radio network temporary identifier (C-RNTI) or a power saving RNTI (PS-RNTI). The DCI may be received in a UE specific SS or a common SS.

In one example, the first group index is configured by a higher layer signal.

In one example, the communication device determines that a sixth group index of at least one sixth SS set is a default group index, if the at least one sixth SS set is not configured with a group index.

In one example, one of the at least one first SS set is configured with the second group index. That is, a SS set may be configured with two group indices.

In one example, the first group index is determined according to a CORESET Pool Index for a CORESET associated with one of the at least one first SS set.

In one example, the communication device detects the PDCCH for the first serving cell according to a predetermined SS set. The communication device stops detecting the PDCCH for the first serving cell according to the at least one third SS set except the predetermined SS set, when stopping detecting the PDCCH for the first serving cell according to the at least one third SS set for the first time period according to the at least one indicator. That is, the detection of the PDCCH regarding to the predetermined SS set is not affected by the at least one indicator. In one example, the predetermined SS set comprises a common SS (CSS) set. In one example, the predetermined SS set comprises a UE-specific SS (USS) set with a SS set index.

In one example, the communication device stops detecting the PDCCH for the first serving cell, when stopping detecting the PDCCH for the first serving cell according to the at least one third SS set for the first time period according to the at least one indicator. That is, the detection of all the SS set for the first serving cell may be stopped.

In one example, the communication device detects the PDCCH for the first serving cell according to the at least one second SS set with the second group index according to the at least one indicator, after a second time period after receiving the at least one indicator.

In one example, the communication device stops detecting the PDCCH for the first serving cell for the first time period according to the at least one first SS set with the first group index according to the at least one indicator, after a third time period after receiving the at least one indicator.

In one example, the communication device detects the PDCCH for the first serving cell according to at least one seventh SS set with a default group index, when a timer expires. In one example, the communication device stops detecting the PDCCH for the first serving cell according to at least one eighth SS set with another group index. In one example, a value of the default group index is 0. In one example, a value of the timer is not larger than a value of a bandwidth part (BWP)-inactivity timer for the first serving cell.

In one example, the second group index is associated with an empty SS set. In one example, the communication device stops a BWP-inactivity timer for the first serving cell, when detecting the PDCCH for the first serving cell according to the at least one second SS set with the second group index according to the at least one indicator. In one example, the communication device changes (or switches) an active BWP according to expiration of a BWP-inactivity timer, wherein the active BWP is a default BWP or a dormancy BWP (e.g., configured by the network).

In one example, the communication device stops a BWP-inactivity timer for the first serving cell, when stopping detecting the PDCCH for the first serving cell for the first time period according to the at least one indicator.

In one example, the communication device changes (or switches) an active BWP according to expiration of a BWP-inactivity timer, when stopping detecting the PDCCH for the first serving cell according to the at least one third SS set for the first time period according to the at least one indicator, wherein the active BWP is a default BWP or a dormancy BWP (e.g., configured by the network).

In one example, the at least one first SS set is configured for a BWP of the first serving cell.

In one example, the at least one second SS set is configured for a BWP of the first serving cell.

In one example, the first serving cell is a scheduled cell of a second serving cell configured by the network.

In one example, the communication device detects the PDCCH according to at least one ninth SS set for the second serving cell, wherein at least one identity of the at least one eighth SS set of the second serving cell comprises at least one identity of the at least one first SS set of the first serving cell, when detecting the PDCCH for the first serving cell according to the at least one first SS set with the first group index according to the at least one indicator.

In one example, the communication device stops detecting the PDCCH for the first serving cell according to the at least one first SS set and stopping detecting the PDCCH for the second serving cell according to the at least one eighth SS set, according to the at least one indicator.

In one example, the communication device detects the PDCCH for the second serving cell according to a predetermined SS set. The communication device stops detecting the PDCCH for the second serving cell according to the at least one ninth SS set except the predetermined SS set, when stopping detecting the PDCCH for the second serving cell according to the at least one ninth SS set for a fourth time period according to the at least one indicator.

In one example, the communication device stops detecting the PDCCH for the second serving cell according to the at least one eighth SS set, after a fifth time period after receiving the at least one indicator. Note that the fifth time period and the third time period may be the same.

In one example, the at least one indicator indicates detecting the PDCCH for the first serving cell. In one example, the at least one indicator indicates detecting the PDCCH for a plurality of serving cells comprising the first serving cell.

Figure 4:
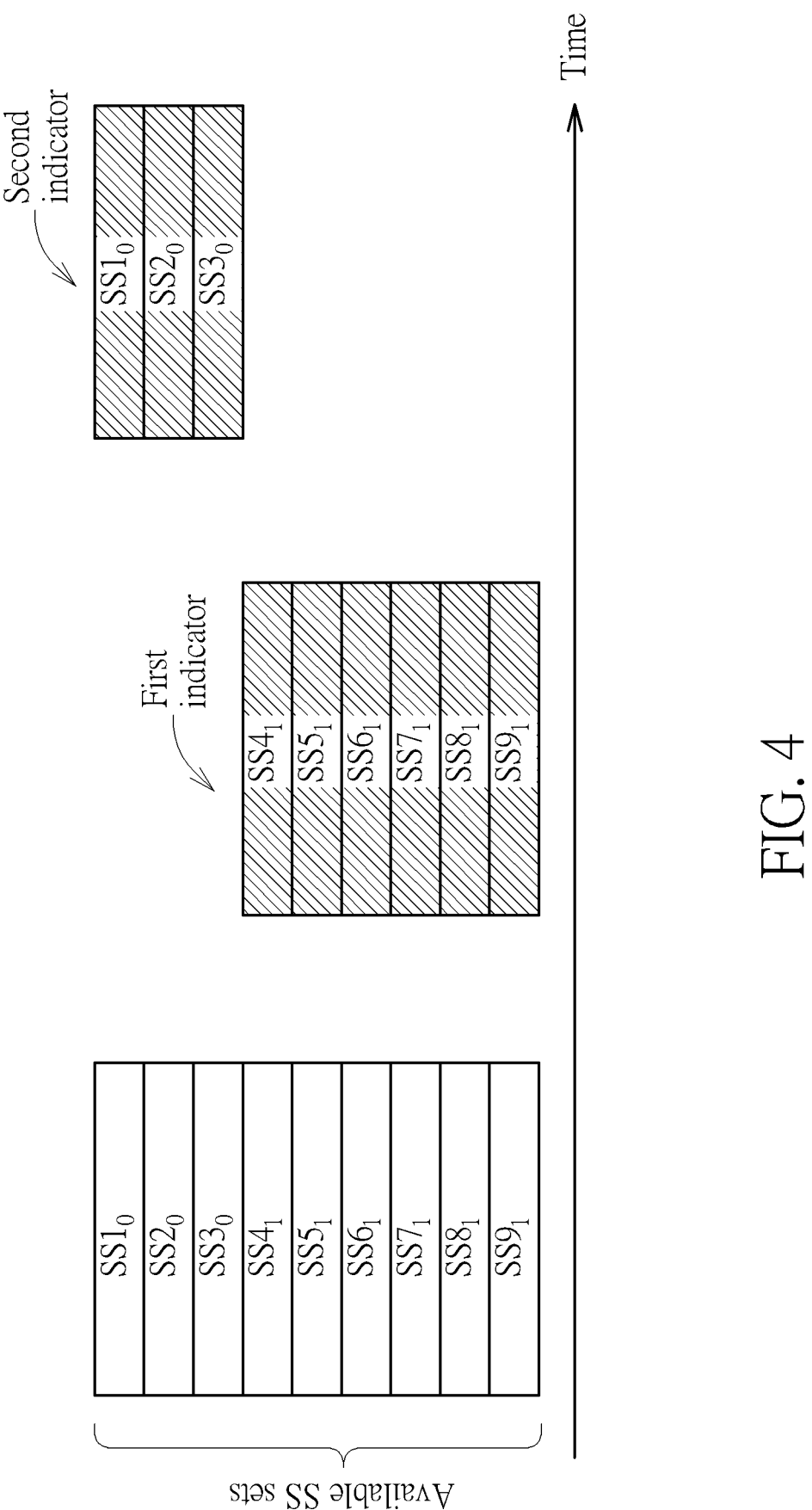
FIG. 4 is a schematic diagram of detection of a PDCCH according to an example of the present invention.

FIG. 4 is a schematic diagram of detection of a PDCCH according to an example of the present invention. There are available SS sets SS1-SS9 configured by the network for a BWP (e.g., active BWP) of a serving cell. The SS sets SS1-SS9 are configured with SS set indices 1-9, respectively. A SS set index for a SS set may be 0, 1, . . . , 38 or 39. The SS sets SS1-SS3 are configured with a group index 0 (e.g., $SS1_0$-$SS3_0$), and the SS sets SS4-SS9 are configured with a group index (e.g., $SS4_1$-$SS9_1$). The communication device may receive a first indicator in a DCI (e.g., with a DCI received in a USS) from the network. The first indicator may indicate the group index 1 for the SS set(s). The communication device detects the PDCCH according to the SS sets SS4-SS9 according to the first indicator (e.g., after a first time period after receiving the first indicator). The communication device may receive a second indicator in the DCI from the network. The second indicator may indicate the group index 0 for the SS set (s). The communication device detects the PDCCH according to the SS sets SS1-SS3 according to the second indicator (e.g., after a second time period after receiving the second indicator).

In one example, the second indicator may be generated according to expiration of a timer of the communication device. The second indicator may indicate a default group index (e.g., 0) for the SS set (s). The communication device detects the PDCCH according to the SS sets SS1-SS3 according to the second indicator. In one example, a value of the timer may not be larger than a value of a BWP-inactivity timer. The BWP-inactivity timer may indicate the communication device to change an active BWP (e.g., default BWP) upon expiration of the BWP-inactivity timer.

In one example, the communication device may receive a third indicator in the DCI from the network. The third indicator may indicate a group index for the SS set(s) and there is no SS set associated with the group index (i.e., empty SS set). The communication device may stop a BWP-inactivity timer for the serving cell.

In one example, the communication device may receive a fourth indicator in the DCI from the network. The fourth indicator may indicate a group index for the SS set(s) and there is no SS set associated with the group index (i.e., empty SS set). The communication device may change an active BWP according to expiration of a BWP-inactivity timer. The active BWP may be a default BWP or a dormancy BWP.

In one example, a SS set may be configured with multiple group indices (e.g., 0 and 1) and each group index may correspond to a monitoring slot periodicity (e.g., P0 and P1) and/or a monitoring slot offset (e.g., O0 and O1) for the SS set. In this case, when a fifth indicator indicates the group index 0, the communication device may detect the PDCCCH according to the SS set with the monitoring slot periodicity (e.g., P0) and/or the monitoring slot offset (e.g., O0).

Figure 5:
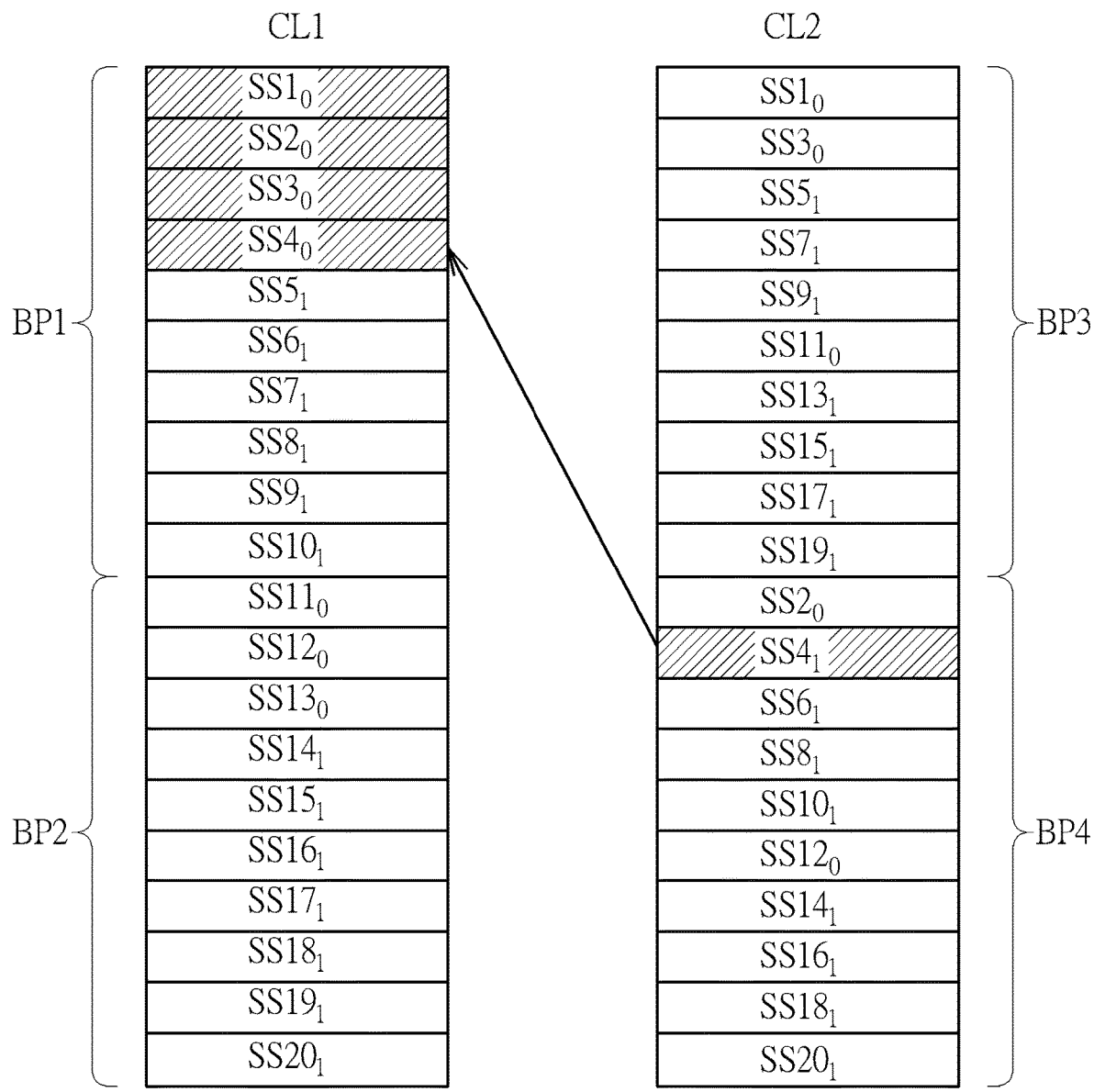
FIG. 5 is a schematic diagram of detection of a PDCCH for multiple serving cells according to an example of the present invention.

FIG. 5 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1, and there are SS sets SS11-SS20 for a BWP BP2 (i.e., inactive BWP) of the serving cell CL1. The SS sets SS1-SS4 and SS11-SS13 are configured with a group index 0. The SS sets SS5-SS10 and SS14-SS20 are configured with a group index 1.

For a serving cell, the communication device may be configured with multiple (e.g., up to four) BWPs and one BWP may be activated in a time period. As shown in FIG. 5, there are the SS sets SS1, SS3, SS5, . . . , SS19 for a BWP BP3 (i.e., inactive BWP) of the serving cell CL2, and there are the SS sets SS0, SS2, SS4, . . . , SS20 for a BWP BP4 (i.e., active BWP) of the serving cell CL2. The SS sets SS1-SS3 and SS11-SS12 are configured with the group index 0. The SS sets SS4-SS10 and SS13-SS20 are configured with the group index 1.

The communication device may receive indicators in a DCI (e.g., with a DCI received in a USS) from the network. The indicators may indicate (0, 1) for the serving cells CL1 and CL2, respectively. The communication device detects the PDCCH according to the SS sets SS1-SS20 for the serving cells CL1 and CL2 according to the indicators.

In detail, the communication device detects the PDCCH for the serving cell CL1 according to the SS sets SS1-SS4 according to that the group index 0 comprises (e.g., is equal to) the indicator 0 and the BWP of the SS sets SS1-SS4 is the active BWP. The PDCCH for the serving cell CL1 are not detected according to the SS sets SS5-SS20. The reason may be that the group index 1 is not comprised in the indicator 0.

In addition, the communication device detects the PDCCH for the serving cell CL2 according to the SS set SS4 according to that the group index 1 comprises (e.g., is equal to) the indicator 1, the BWP of the SS set SS4 is the active BWP and the PDCCH for the serving cell CL1 is also detected according to the SS set SS4 (i.e., the SS set SS4 are used for both the serving cells). The PDCCH for the serving cell CL2 are not detected according to the SS sets SS1-SS3 and SS5-SS20. The reason may be that the group index 0 does not comprise the indicator 1 or the SS sets are not mapped by the detected SS sets of the serving cell CL1.

Figure 6:
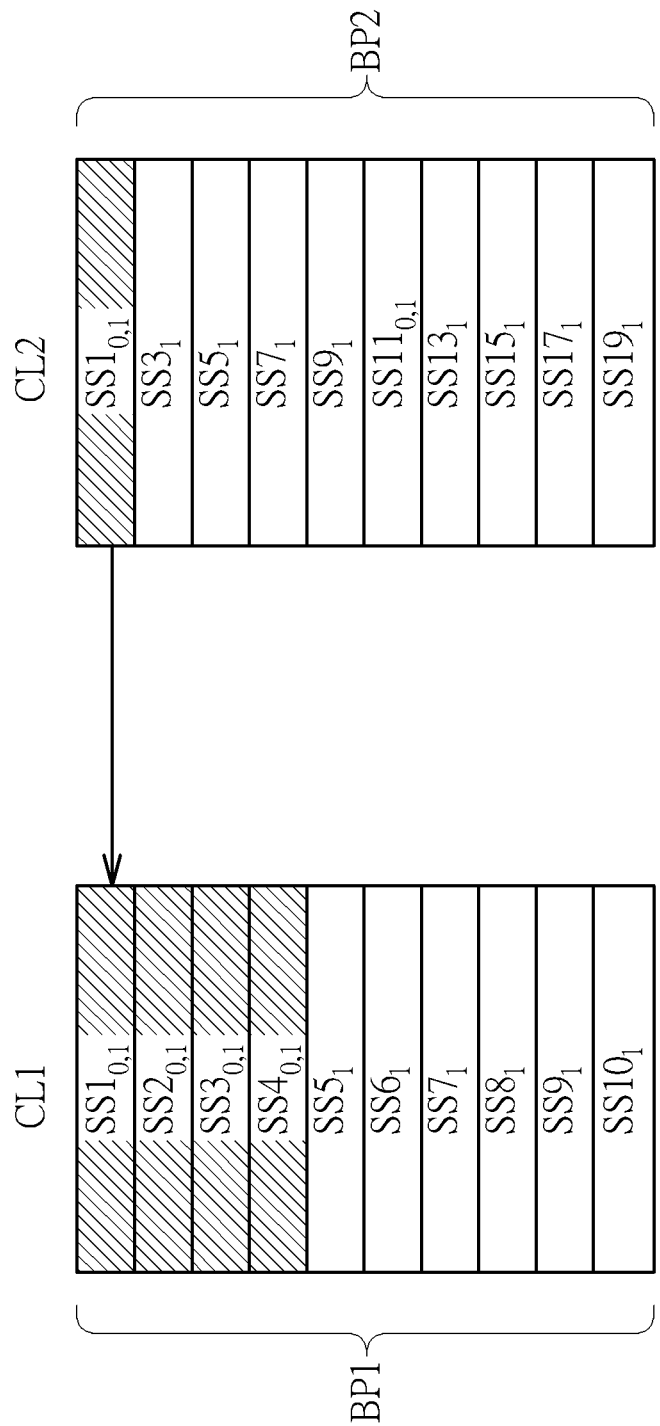
FIG. 6 is a schematic diagram of detection of a PDCCH for multiple serving cells according to an example of the present invention.

FIG. 6 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1. The SS sets SS1-SS4 are configured with group indices (0,1) (e.g., $SS1_{0,1}$-$SS4_{0,1}$). The SS sets SS5-SS10 are configured with a group index 1 (e.g., $SS5_1$-$SS10_1$).

There are SS sets SS1, SS3, SS5, SS7, SS9, SS11, SS13, SS15, SS17 and SS19 for a BWP BP2 (i.e., active BWP) of the serving cell CL2. The SS sets SS1 and SS11 are configured with the group indices (0,1) (e.g., $SS1_{0,1}$, $SS11_{0,1}$). The SS sets SS3, SS5, SS7, SS9, SS13, SS15, SS17 and SS19 are configured with the group index 1 (e.g., $SSX_1$).

In one example, the group indices of the SS sets SS1, SS3, SS5, SS7, SS9, SS11, SS13, SS15, SS17 and SS19 for the BWP BP2 of the serving cell CL2 may be configured by the network. In one example, the group indices of the SS sets SS1, SS3, SS5, SS7, SS9, SS11, SS13, SS15, SS17 and SS19 for the BWP BP2 of the serving cell CL2 may the same as the group indices of the SS sets SS1, SS3, SS5, SS7, SS9, SS11, SS13, SS15, SS17 and SS19 of the serving cell CL1 (i.e., the scheduling cell). In this case, for the serving cell CL2, the SS sets SS1 and SS3 have the group indices (0,1) (e.g., $SS1_{0,1}$, $SS3_{0,1}$), and the SS sets SS5, SS7 and SS9 have the group index 1 (e.g., $SS5_1$, $SS7_1$, $SS9_1$). In one example, a group index of a SS set for a BWP of a serving cell may be a default value (e.g., 1), if the SS set is not configured with a group index.

The communication device may receive an indicator in a DCI (e.g., with a DCI received in a USS) from the network. The indicator may indicate 0 for both the serving cells CL1 and CL2. The communication device detects (e.g., monitors) the PDCCH according to the abovementioned SS sets for the serving cells CL1 and CL2 according to the indicator.

In detail, the communication device detects the PDCCH for the serving cell CL1 according to the SS sets SS1-SS4 according to that the group indices (0,1) comprise the indicator 0 and the BWP BP1 is the active BWP. The PDCCH for the serving cell CL1 are not detected according to the SS sets SS5-SS10.

In addition, the communication device detects the PDCCH for the serving cell CL2 according to the SS set SS1 according to that the group indices (0,1) comprise the indicator 0, the BWP BP2 is the active BWP and the PDCCH for the serving cell CL1 is also detected according to the SS set SS1 (i.e., the SS set SS1 are used for both the serving cells). The PDCCH for the serving cell CL2 are not detected according to the SS sets SS3, SS5, SS7, SS9, SS11, SS13, SS15, SS17 and SS19. The reason may be that the group index does not comprise the indicator 0 or the SS sets are not mapped by the detected SS sets of the serving cell CL1.

Figure 7:
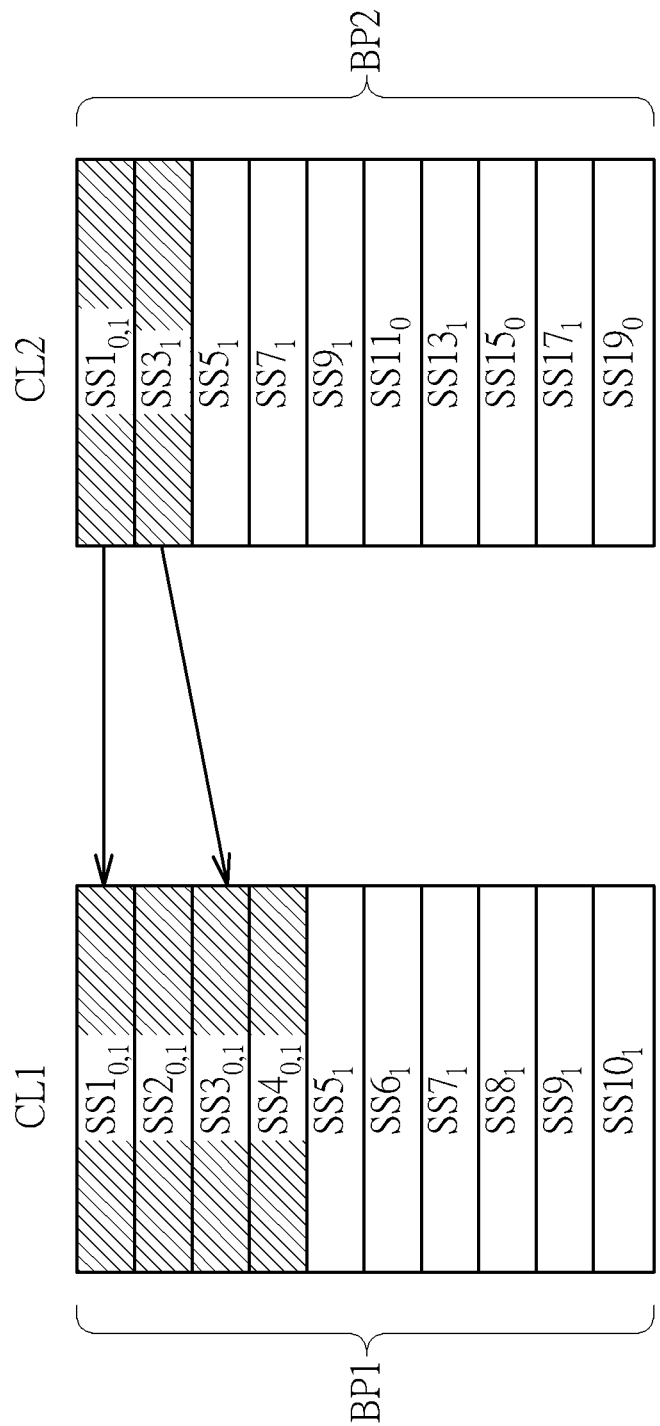
FIG. 7 is a schematic diagram of detection of a PDCCH for multiple serving cells according to an example of the present invention.

FIG. 7 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1. The SS sets SS1-SS4 are configured with a group indices (0,1) (e.g., $SS1_{0,1}$-$SS4_{0,1}$). The SS sets SS5-SS10 are configured with a group index 1 (e.g., $SS5_1$-$SS10_1$).

There are SS sets SS1, SS3, SS5, SS7, SS9, SS11, SS13, SS15, SS17 and SS19 for a BWP BP2 (i.e., active BWP) of the serving cell CL2. The SS set SS1 is configured with the group indices (0,1) (e.g., $SS1_{0,1}$). The SS sets SS11, SS15 and SS19 are configured with the group index 0 (e.g., $SSX_0$). The SS sets SS3, SS5, SS7, SS9, SS13 and SS17 are configured with the group index 1 (e.g., $SSX_1$).

The communication device may receive indicators in a DCI (e.g., with a DCI received in a USS) from the network. The indicators may indicate 0 and 1 for the serving cells CL1 and CL2, respectively. The communication device detects (e.g., monitors) the PDCCH according to the abovementioned SS sets for the serving cells CL1 and CL2 according to the indicators.

In detail, the communication device detects the PDCCH for the serving cell CL1 according to the SS sets SS1-SS4 according to that the group indices (0,1) comprise the indicator 0 and the BWP BP1 is the active BWP. The PDCCH for the serving cell CL1 are not detected according to the SS sets SS5-SS10.

In addition, the communication device detects the PDCCH for the serving cell CL2 according to the SS sets SS1 and SS3 according to that the group indices (0,1) and 1 comprise the indicator 1, the BWP BP2 is the active BWP and the PDCCH for the serving cell CL1 is also detected according to the SS sets SS1 and SS3 (i.e., the SS sets SS1 and SS3 are used for both the serving cells). The PDCCH for the serving cell CL2 are not detected according to the SS sets SS5, SS7, SS9, SS11, SS13, SS15, SS17 and SS19. The reason may be that the group index does not comprise the indicator 1 or the SS sets are not mapped by the detected SS sets of the serving cell CL1.

Figure 8:
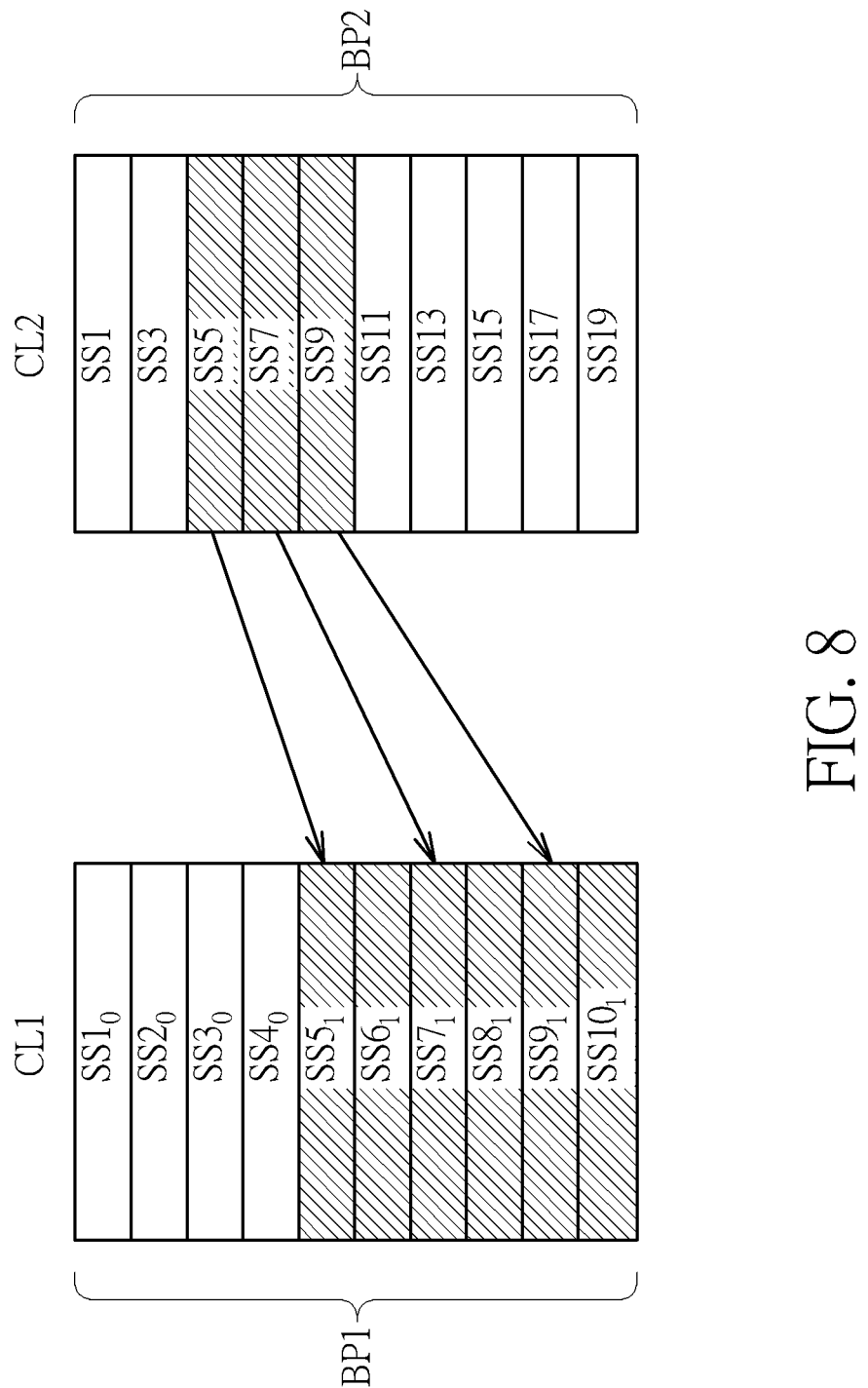
FIG. 8 is a schematic diagram of detection of a PDCCH for multiple serving cells according to an example of the present invention.

FIG. 8 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1. The SS sets SS1-SS4 are configured with a group index 0 (e.g., $SS1_0$-$SS4_0$). The SS sets SS5-SS10 are configured with a group index 1 (e.g., $SS5_1$-$SS10_1$).

There are SS sets SS1, SS3, SS5, SS7, SS9, SS11, SS13, SS15, SS17 and SS19 for a BWP BP2 (i.e., active BWP) of the serving cell CL2. The abovementioned SS sets are not configured with a group index.

The communication device may receive an indicator in a DCI (e.g., with a DCI received in a USS) from the network. The indicator may indicate 1 for the serving cells CL1 and CL2. The communication device detects (e.g., monitors) the PDCCH according to the abovementioned SS sets for the serving cells CL1 and CL2 according to the indicator.

In detail, the communication device detects the PDCCH for the serving cell CL1 according to the SS sets SS5-SS10 according to that the group index 1 comprise (e.g., is equal to) the indicator 1 and the BWP BP1 is the active BWP. The PDCCH for the serving cell CL1 are not detected according to the SS sets SS1-SS4.

In addition, the communication device detects the PDCCH for the serving cell CL2 according to the SS sets SS5, SS7 and SS9 according to that the BWP BP2 is the active BWP and the PDCCH for the serving cell CL1 is also detected according to the SS sets SS5, SS7 and SS9 (i.e., the SS sets SS5, SS7 and SS9 are used for both the serving cells). The PDCCH for the serving cell CL2 are not detected according to the SS sets SS1, SS3, SS11, SS13, SS15, SS17 and SS19. The reason may be that the SS sets are not mapped by the detected SS sets of the serving cell CL1.

Thus, the PDCCH for the serving cell CL2 can still be detected according to the detection of the PDCCH for the serving cell CL1, even if the SS sets of the serving cell CL2 are not configured with a group index.

Figure 9:
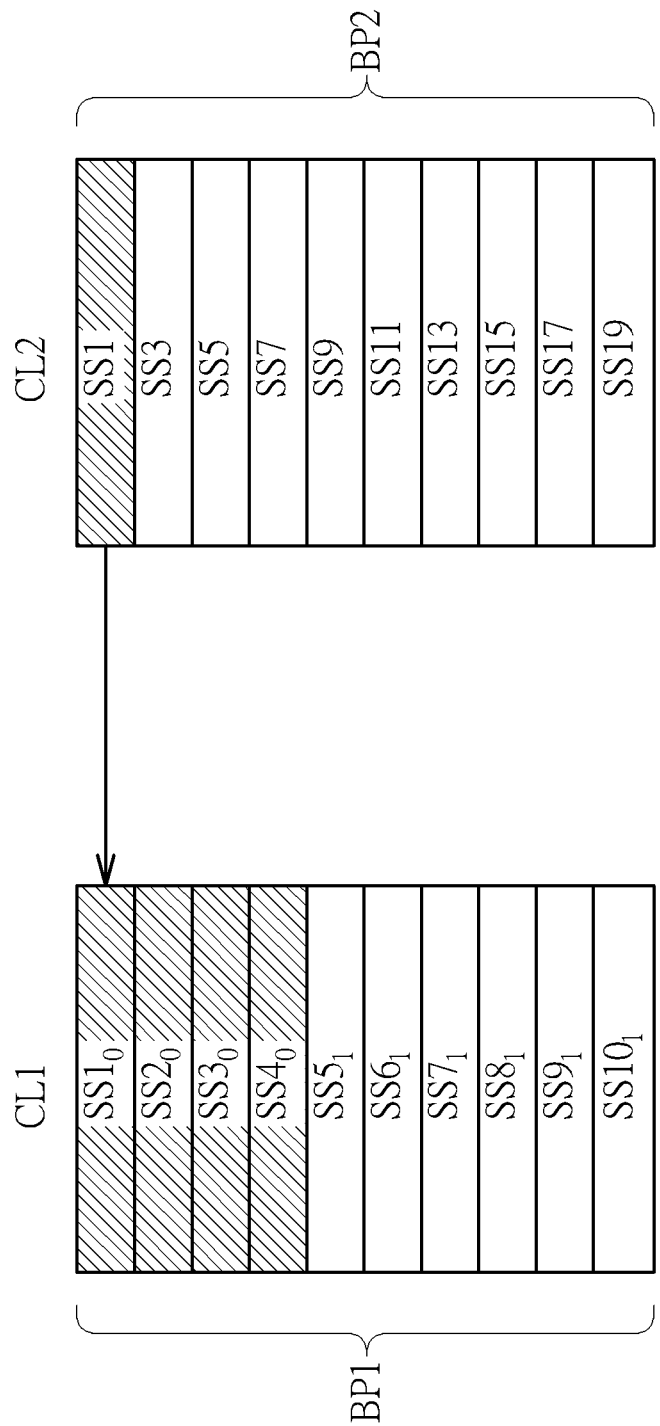
FIG. 9 is a schematic diagram of detection of a PDCCH for multiple serving cells according to an example of the present invention.

FIG. 9 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1. The SS sets SS1-SS4 are configured with a group index 0 (e.g., $SS1_0$-$SS4_0$). The SS sets SS5-SS10 are configured with a group index 1 (e.g., $SS5_1$-$SS10_1$).

There are SS sets SS1, SS3, SS5, SS7, SS9, SS11, SS13, SS15, SS17 and SS19 for a BWP BP2 (i.e., active BWP) of the serving cell CL2. The abovementioned SS sets are not configured with a group index.

The communication device may receive an indicator in a DCI (e.g., with a DCI received in a USS) from the network. The indicator may indicate 0 for the serving cells CL1 and CL2. The communication device detects (e.g., monitors) the PDCCH according to the abovementioned SS sets for the serving cells CL1 and CL2 according to the indicator.

In detail, the communication device detects the PDCCH for the serving cell CL1 according to the SS sets SS1-SS4 according to that the group index 0 comprise (e.g., is equal to) the indicator 0 and the BWP BP1 is the active BWP. The PDCCH for the serving cell CL1 are not detected according to the SS sets SS5-SS10.

In addition, the indicator 0 means for the serving cell CL2 that all the SS sets are not used for detecting the PDCCH except one SS set (e.g., a predetermined SS set). That is, the indicator 0 means "switching off" or "stopping" the PDCCH detection (monitoring) for the serving cell CL2 while one SS set is the exception. In one example, the only used SS set may be the SS set with the lowest index, i.e., the SS set SS1. In one example, the only used SS set may be at least one CSS set. The communication device detects the PDCCH for the serving cell CL2 according to the SS set SS1 according to the indicator 0. The PDCCH for the serving cell CL2 are not detected according to the other SS sets.

Thus, the PDCCH for the serving cell CL2 can still be detected according to the detection of the PDCCH for the serving cell CL1, even if the SS sets of the serving cell CL2 are not configured with a group index.

Figure 10:
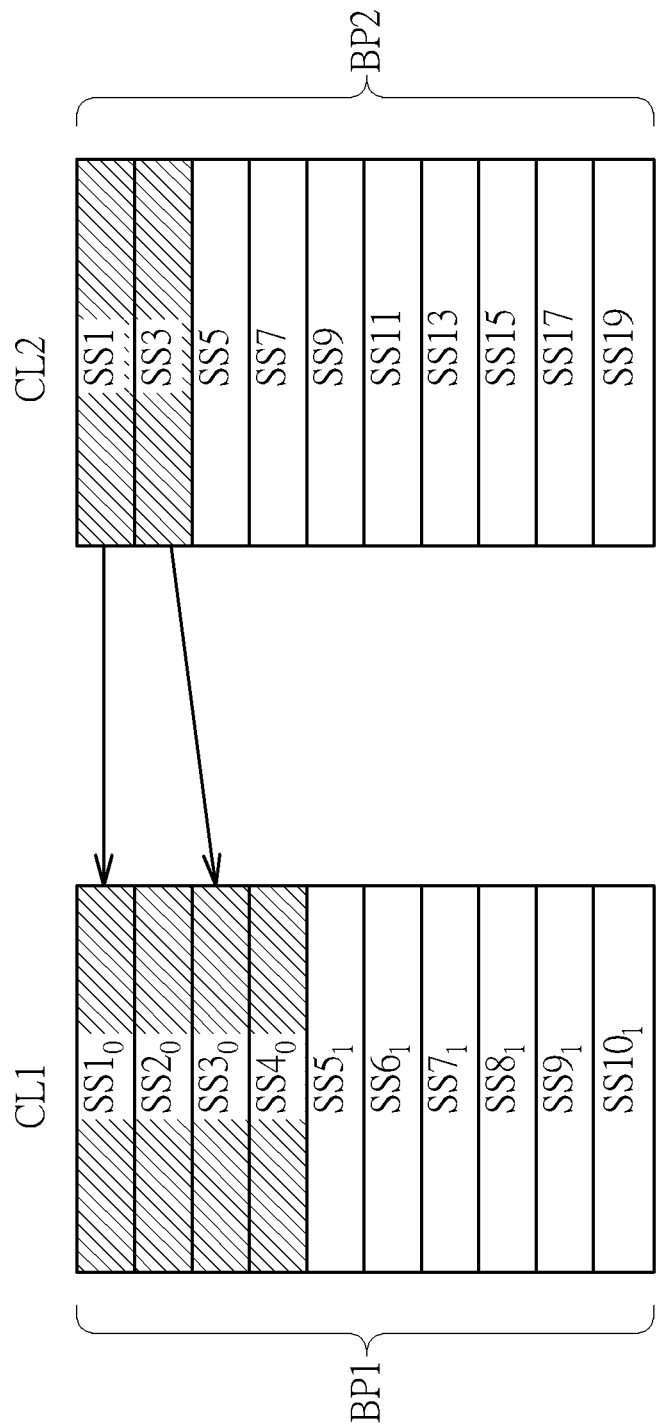
FIG. 10 is a schematic diagram of detection of a PDCCH for multiple serving cells according to an example of the present invention.

FIG. 10 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1. The SS sets SS1-SS4 are configured with a group index 0 (e.g., $SS1_0$-$SS4_0$). The SS sets SS5-SS10 are configured with a group index 1 (e.g., $SS5_1$-$SS10_1$).

There are SS sets SS1, SS3, SS5, SS7, SS9, SS11, SS13, SS15, SS17 and SS19 for a BWP BP2 (i.e., active BWP) of the serving cell CL2. The abovementioned SS sets are not configured with a group index.

The communication device may receive two indicators in a DCI (e.g., with a DCI received in a USS) from the network. The indicators may indicate 0 and 1 for the serving cells CL1 and CL2, respectively. The communication device detects (e.g., monitors) the PDCCH according to the abovementioned SS sets for the serving cells CL1 and CL2 according to the indicators.

In detail, the communication device detects the PDCCH for the serving cell CL1 according to the SS sets SS1-SS4 according to that the group index 0 comprise (e.g., is equal to) the indicator 0 and the BWP BP1 is the active BWP. The PDCCH for the serving cell CL1 are not detected according to the SS sets SS5-SS10.

In addition, the indicator 1 means for the serving cell CL2 that the SS sets may be used for detecting the PDCCH. That is, the indicator 1 means "switching on" or "enabling" the PDCCH detection (monitoring) for the serving cell CL2. The communication device detects the PDCCH for the serving cell CL2 according to the SS sets SS1 and SS3 according to that the BWP BP2 is the active BWP and the PDCCH for the serving cell CL1 is also detected according to the SS sets SS1 and SS3 (i.e., the SS sets SS1 and SS3 are used for both the serving cells). The PDCCH for the serving cell CL2 are not detected according to the SS sets SS5, SS7, SS9, SS11, SS13, SS15, SS17 and SS19. The reason may be that the SS sets are not mapped by the detected SS sets of the serving cell CL1.

Thus, the PDCCH for the serving cell CL2 can still be detected according to the detection of the PDCCH for the serving cell CL1, even if the SS sets of the serving cell CL2 are not configured with a group index.

Figure 11:
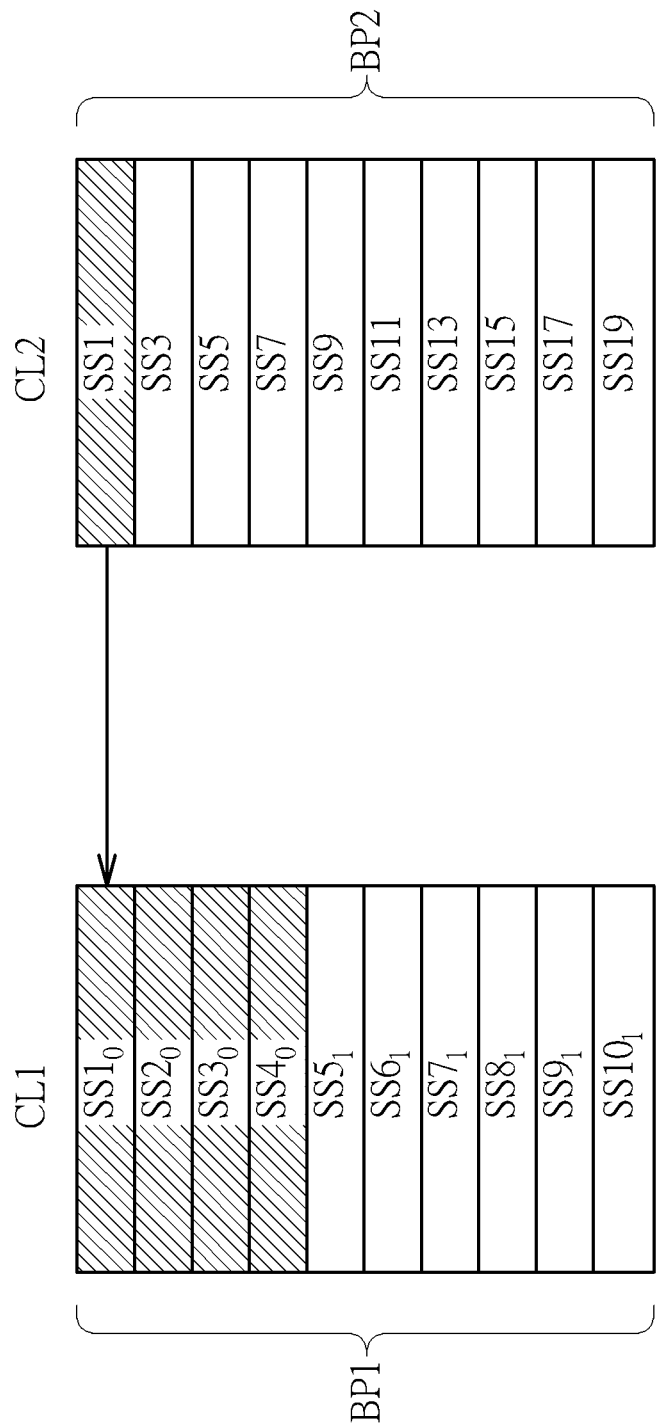
FIG. 11 is a schematic diagram of detection of a PDCCH for multiple serving cells according to an example of the present invention.

FIG. 11 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1. The SS sets SS1-SS4 are configured with a group index 0 (e.g., $SS1_0$-$SS4_0$). The SS sets SS5-SS10 are configured with a group index 1 (e.g., $SS5_1$-$SS10_1$).

There are SS sets SS1, SS3, SS5, SS7, SS9, SS11, SS13, SS15, SS17 and SS19 for a BWP BP2 (i.e., active BWP) of the serving cell CL2. The abovementioned SS sets are not configured with a group index.

The communication device may receive two indicators in a DCI (e.g., with a DCI received in a USS) from the network. The indicators may indicate 0 for both the serving cells CL1 and CL2. The communication device detects (e.g., monitors) the PDCCH according to the abovementioned SS sets for the serving cells CL1 and CL2 according to the indicators.

In detail, the communication device detects the PDCCH for the serving cell CL1 according to the SS sets SS1-SS4 according to that the group index 0 comprise (e.g., is equal to) the indicator 0 and the BWP BP1 is the active BWP. The PDCCH for the serving cell CL1 are not detected according to the SS sets SS5-SS10.

In addition, the indicator 0 means for the serving cell CL2 that all the SS sets are not used for detecting the PDCCH except one SS set (e.g., a predetermined SS set). That is, the indicator 0 means "switching off" or "stopping" the PDCCH detection (monitoring) for the serving cell CL2 while one SS set is the exception. In one example, the only used SS set may be the SS set with the lowest index, i.e., the SS set SS1. In one example, the only used SS set may be at least one CSS set. The communication device detects the PDCCH for the serving cell CL2 according to the SS set SS1 according to the indicator 0. The PDCCH for the serving cell CL2 are not detected according to the other SS sets.

Thus, the PDCCH for the serving cell CL2 can still be detected according to the detection of the PDCCH for the serving cell CL1, even if the SS sets of the serving cell CL2 are not configured with a group index.

Figure 12:
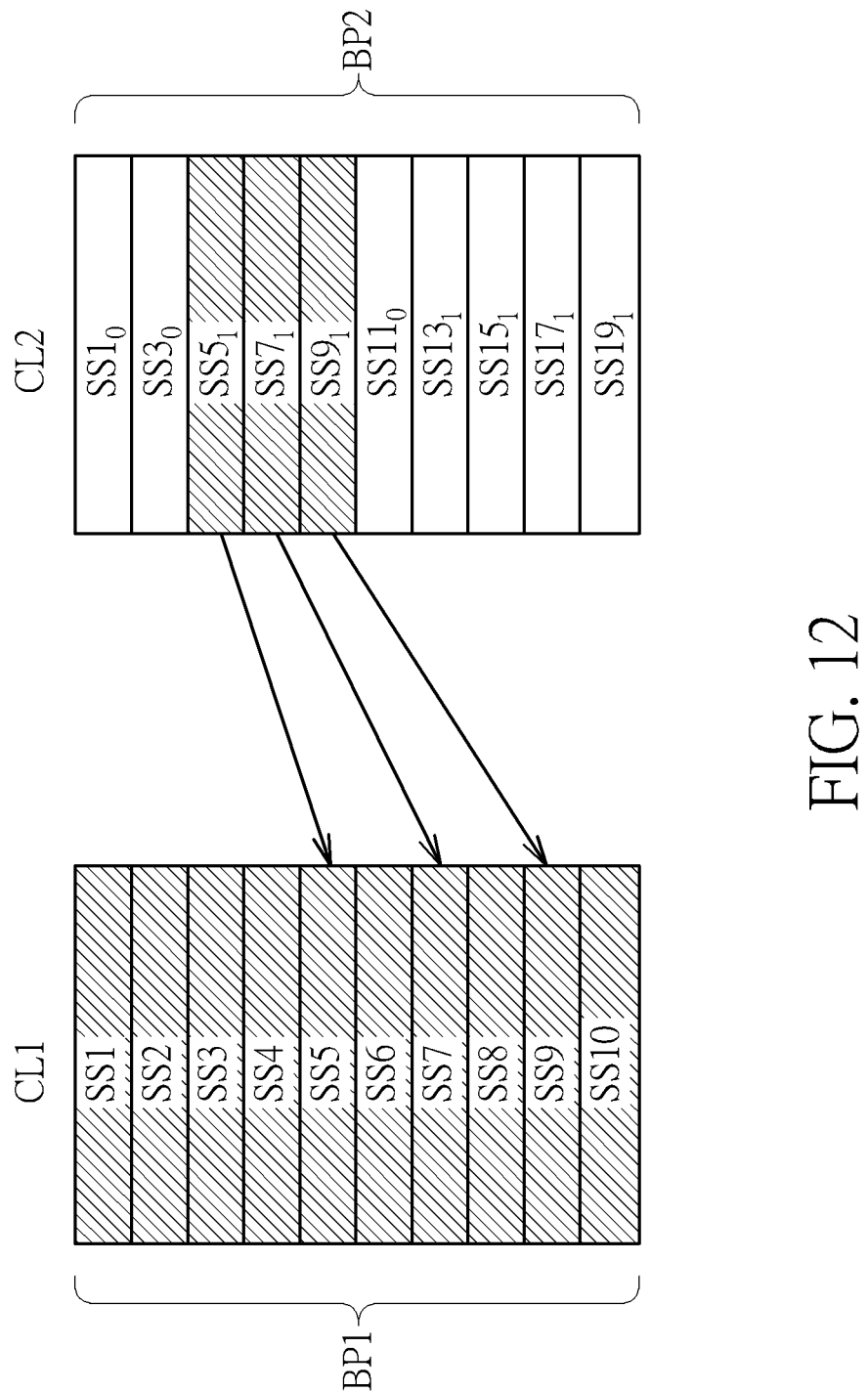
FIG. 12 is a schematic diagram of detection of a PDCCH for multiple serving cells according to an example of the present invention.

FIG. 12 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1. The abovementioned SS sets are not configured with a group index.

There are SS sets SS1, SS3, SS5, SS7, SS9, SS11, SS13, SS15, SS17 and SS19 for a BWP BP2 (i.e., active BWP) of the serving cell CL2. The SS sets SS1, SS3 and SS11 are configured with the group index 0 (e.g., $SSX_0$). The SS sets SS5, SS7, SS9, SS13, SS15, SS17 and SS19 are configured with the group index 1 (e.g., $SSX_1$).

The communication device may receive two indicators in a DCI (e.g., with a DCI received in a USS) from the network. The indicators may indicate 1 for both the serving cells CL1 and CL2. The communication device detects (e.g., monitors) the PDCCH according to the abovementioned SS sets for the serving cells CL1 and CL2 according to the indicators.

In detail, the indicator 1 means for the serving cell CL1 that the SS sets may be used for detecting the PDCCH. That is, the indicator 1 means "switching on" or "enabling" the PDCCH detection (monitoring) for the serving cell CL1. The communication device detects the PDCCH for the serving cell CL1 according to the SS sets SS1-SS10 according to that the BWP BP1 is the active BWP.

In addition, the communication device detects the PDCCH for the serving cell CL2 according to the SS sets SS5, SS7 and SS9 according to that the group index 1 comprises (e.g., is equal to) the indicator 1, the BWP BP2 is the active BWP and the PDCCH for the serving cell CL1 is also detected according to the SS sets SS5, SS7 and SS9 (i.e., the SS sets SS5, SS7 and SS9 are used for both the serving cells). The PDCCH for the serving cell CL2 are not detected according to the SS sets SS1, SS3, SS11, SS13, SS15, SS17 and SS19. The reason may be that the group index does not comprise the indicator 1 or the SS sets are not mapped by the detected SS sets of the serving cell CL1.

Thus, the PDCCH for the serving cell CL1 can still be detected, even if the SS sets of the serving cell CL1 are not configured with a group index.

Figure 13:
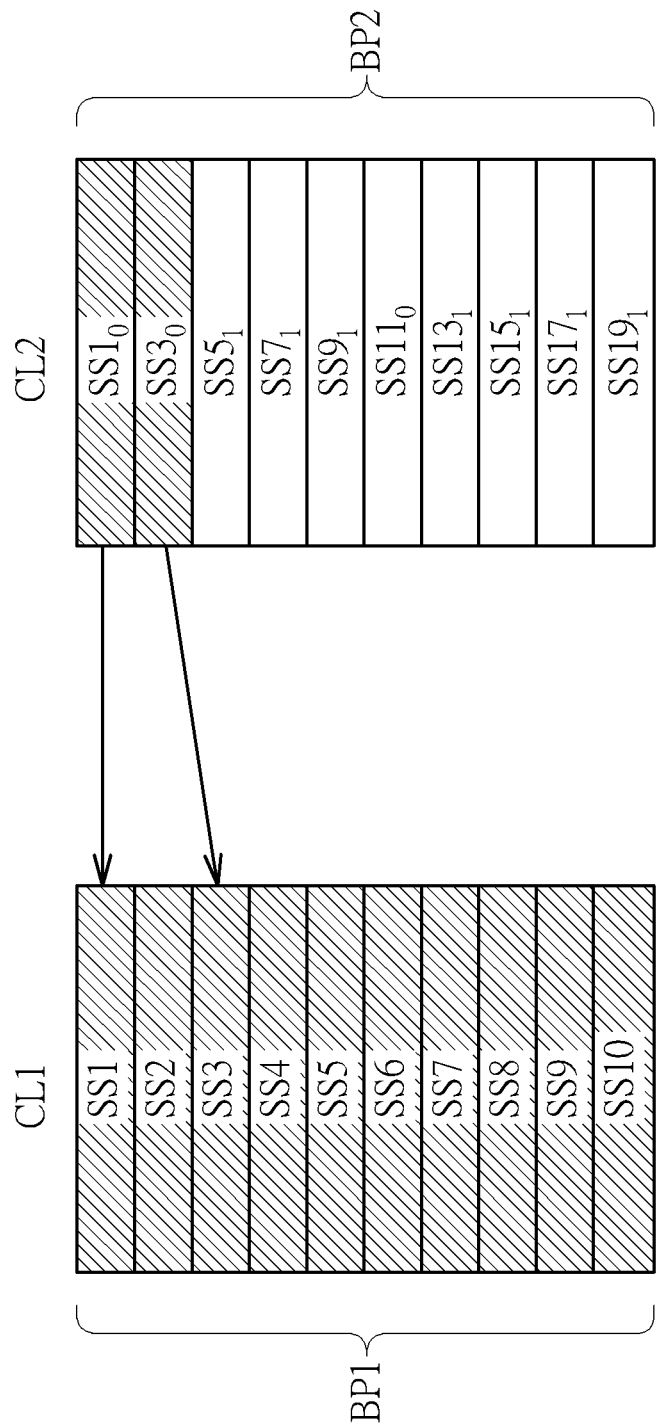
FIG. 13 is a schematic diagram of detection of a PDCCH for multiple serving cells according to an example of the present invention.

FIG. 13 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1. The abovementioned SS sets are not configured with a group index.

There are SS sets SS1, SS3, SS5, SS7, SS9, SS11, SS13, SS15, SS17 and SS19 for a BWP BP2 (i.e., active BWP) of the serving cell CL2. The SS sets SS1, SS3 and SS11 are configured with the group index 0 (e.g., $SSX_0$). The SS sets SS5, SS7, SS9, SS13, SS15, SS17 and SS19 are configured with the group index 1 (e.g., $SSX_1$).

The communication device may receive two indicators in a DCI (e.g., with a DCI received in a USS) from the network. The indicators may indicate 1 and 0 for the serving cells CL1 and CL2, respectively. The communication device detects (e.g., monitors) the PDCCH according to the abovementioned SS sets for the serving cells CL1 and CL2 according to the indicators.

In detail, the indicator 1 means for the serving cell CL1 that the SS sets may be used for detecting the PDCCH. That is, the indicator 1 means "switching on" or "enabling" the PDCCH detection (monitoring) for the serving cell CL1. The communication device detects the PDCCH for the serving cell CL1 according to the SS sets SS1-SS10 according to that the BWP BP1 is the active BWP.

In addition, the communication device detects the PDCCH for the serving cell CL2 according to the SS sets SS1 and SS3 according to that the group index 0 comprises (e.g., is equal to) the indicator 0, the BWP BP2 is the active BWP and the PDCCH for the serving cell CL1 is also detected according to the SS sets SS1 and SS3 (i.e., the SS sets SS1 and SS3 are used for both the serving cells). The PDCCH for the serving cell CL2 are not detected according to the SS sets SS5, SS7, SS9, SS11, SS13, SS15, SS17 and SS19. The reason may be that the group index does not comprise the indicator 0 or the SS sets are not mapped by the detected SS sets of the serving cell CL1.

Thus, the PDCCH for the serving cell CL1 can still be detected, even if the SS sets of the serving cell CL1 are not configured with a group index.

Figure 14:
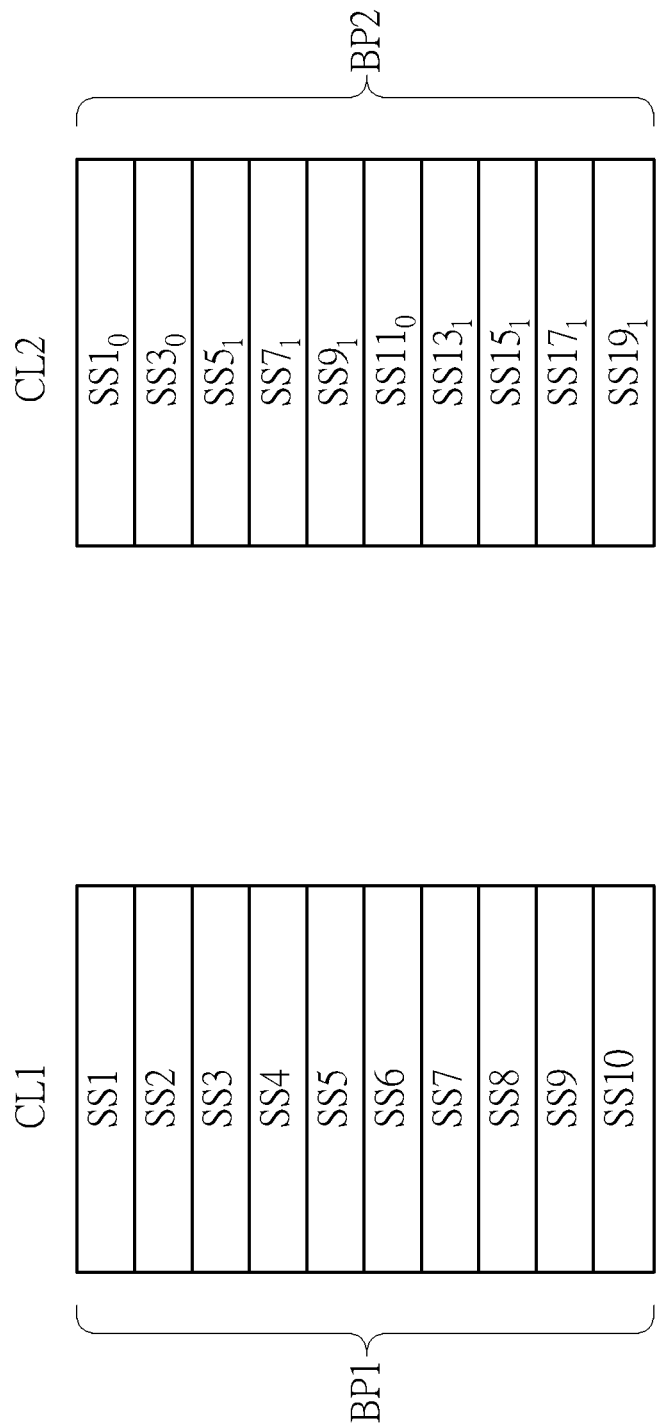
FIG. 14 is a schematic diagram of detection of a PDCCH for multiple serving cells according to an example of the present invention.

FIG. 14 is a schematic diagram of detection of a PDCCH for multiple serving cells according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2.

There are SS sets SS1-SS10 for a BWP BP1 (i.e., active BWP) of the serving cell CL1. The abovementioned SS sets are not configured with a group index.

There are SS sets SS1, SS3, SS5, SS7, SS9, SS11, SS13, SS15, SS17 and SS19 for a BWP BP2 (i.e., active BWP) of the serving cell CL2. The SS sets SS1, SS3 and SS11 are configured with the group index 0 (e.g., $SSX_0$). The SS sets SS5, SS7, SS9, SS13, SS15, SS17 and SS19 are configured with the group index 1 (e.g., $SSX_1$).

The communication device may receive two indicators in a DCI (e.g., with a DCI received in a USS) from the network. The indicators may indicate 0 and 1 for the serving cells CL1 and CL2, respectively. The communication device detects (e.g., monitors) the PDCCH according to the abovementioned SS sets for the serving cells CL1 and CL2 according to the indicators.

In detail, the indicator 0 means for the serving cell CL1 that the SS sets are not used for detecting the PDCCH. That is, the indicator 0 means "switching off" or "stopping" the PDCCH detection (monitoring) for the serving cell CL1. Note that one SS set may be an exception. For example, the communication device may detect the PDCCH according to a USS and/or a CSS, e.g., according to a SS set with a lowest SS set index or at least one predetermined SS set index.

In addition, the PDCCH for the serving cell CL2 is not detected. The reason may be that the SS sets are not mapped by the detected SS sets of the serving cell CL1. That is, the SS sets of the serving cell CL2 is also switched off by the indicator 0 for the serving cell CL1.

Figure 15:
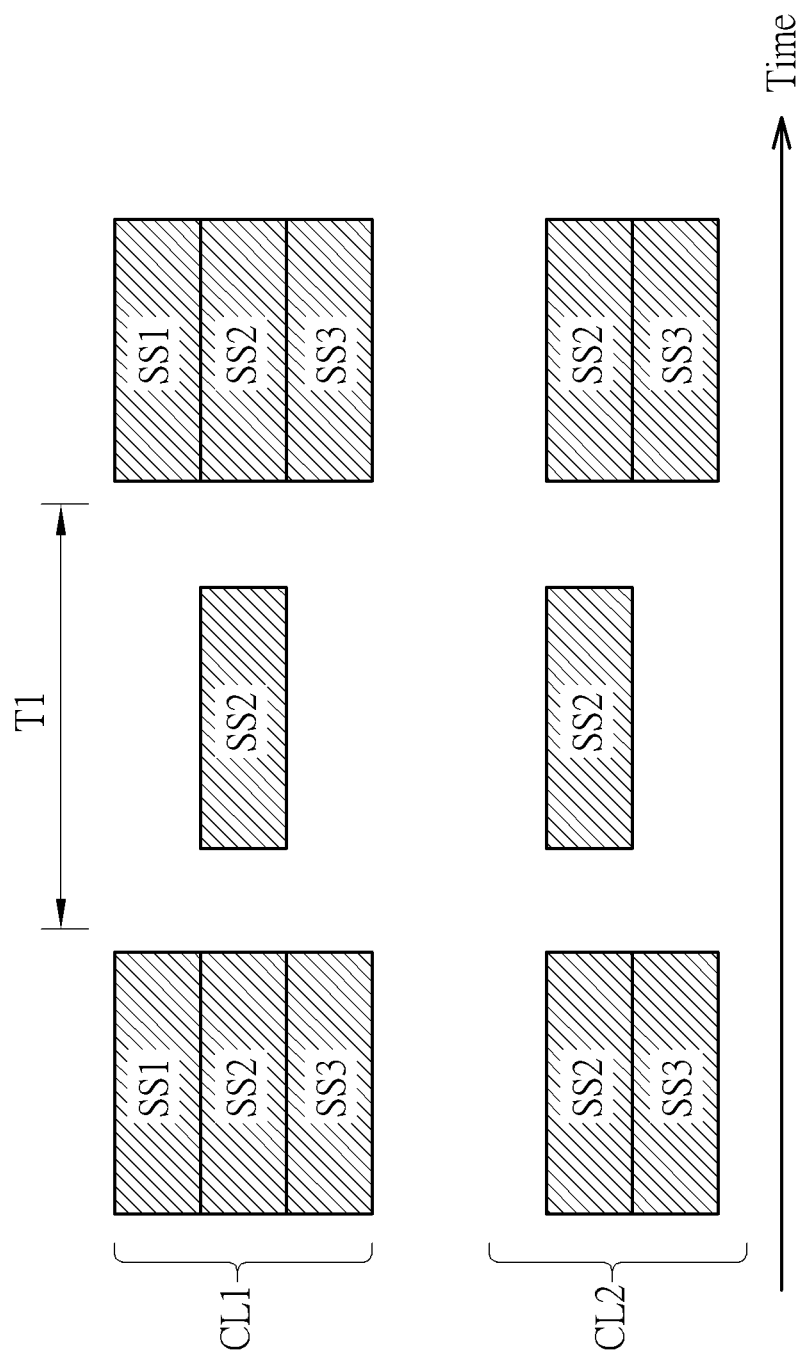
FIG. 15 is a schematic diagram of detection of a PDCCH according to an example of the present invention.

FIG. 15 is a schematic diagram of detection of a PDCCH according to an example of the present invention. There are serving cells CL1 and CL2 for realizing self scheduling and cross-carrier scheduling. The serving cell CL1 may be a scheduling cell, and the serving cell CL2 may be a scheduled cell. In this case, the serving cell CL1 is the scheduling cell of the serving cells CL1 and CL2. There are SS sets SS1-SS3 of the serving cell CL1, and there are SS sets SS2-SS3 of the serving cell CL2.

The communication device detects the PDCCH for the serving cell CL1 according to the SS sets SS1-SS3, and detects the PDCCH for the serving cell CL2 according to the SS sets SS2-SS3.

Then, the communication device may receive an indicator in a DCI (e.g., with a DCI received in a USS) from the network. The indicator may indicate the communication device to stop detecting the PDCCH for the serving cell CL1 for a time interval T1 (e.g., after a third time period after receiving the indicator). In the time interval T1, the communication device detects the PDCCH for the serving cells CL1 and CL2 according to a predetermined SS set (e.g., the SS set SS2), and stops detecting the PDCCH for the serving cells CL1 and CL2 according to other SS set(s). The predetermined SS set may be configured via a higher layer signaling, may have a lowest SS set index, may include a CSS set, etc.

After the time interval T1, the communication device continues to detect the PDCCH for the serving cell CL1 according to the SS sets SS1-SS3, and to detect the PDCCH for the serving cell CL2 according to the SS sets SS2-SS3.

In one example, the communication device may stop a BWP-inactivity timer for the first serving cell, when stopping detecting the PDCCH for the serving cell CL1 for the time period T1 according to the indicator. In one example, the communication device may change an active BWP according to expiration of a BWP-inactivity timer when stopping detecting the PDCCH for the serving cell CL1 for the time period T1 according to the indicator. The active BWP may be a default BWP or a dormancy BWP. In one example, the communication device may stop the BWP-inactivity timer in the default BWP or the dormant BWP. In one example, the communication device may not perform the PDCCH detection in the dormant BWP (e.g., no PDCCH configuration for the dormant BWP)

Figure 16:
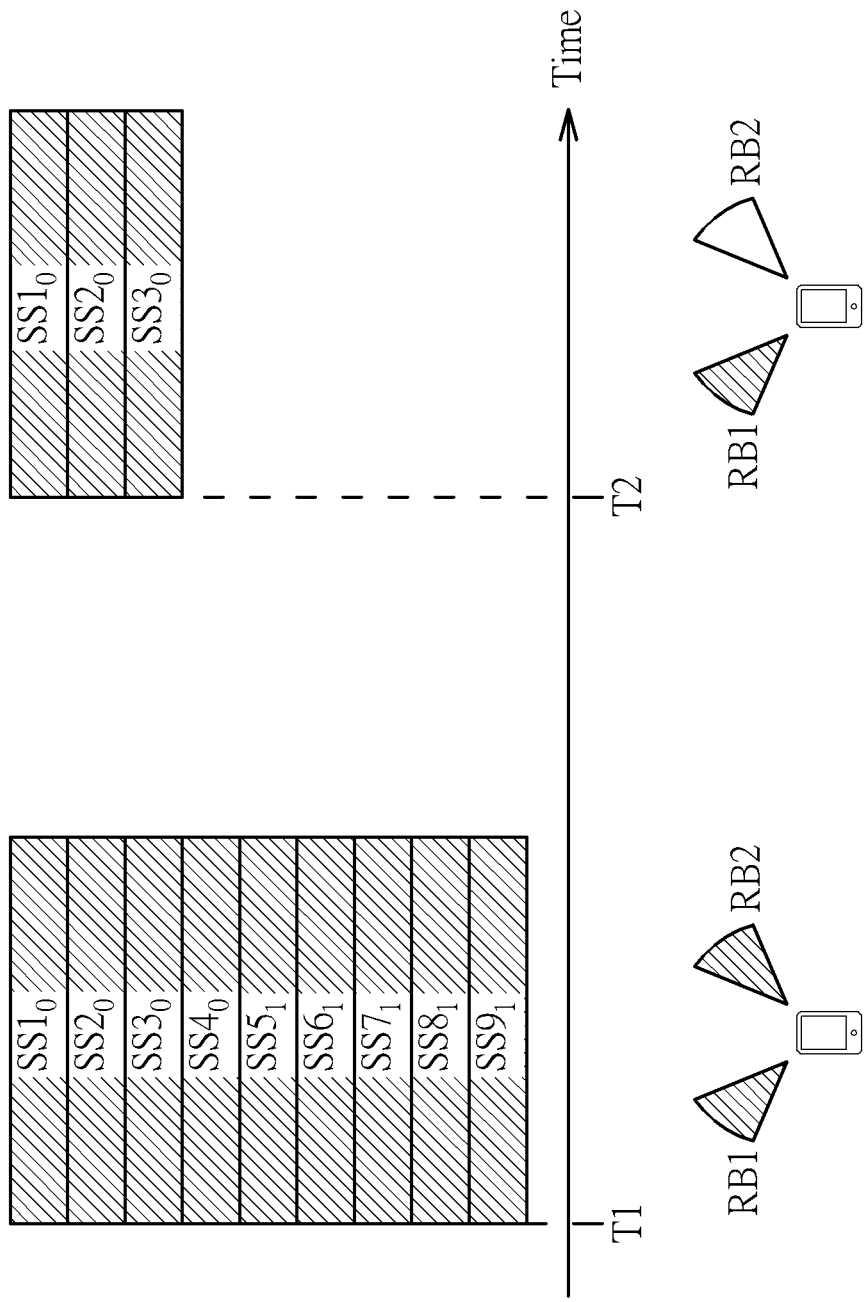
FIG. 16 is a schematic diagram of detection of a PDCCH according to an example of the present invention.

FIG. 16 is a schematic diagram of detection of a PDCCH according to an example of the present invention. There are SS sets SS1-SS9 for a BWP (e.g., active BWP) of a serving cell. The SS sets SS1-SS3 are configured with a group index 0 (e.g., $SS1_0$-$SS3_0$), and the SS sets SS4-SS9 are configured with a group index 1 (e.g., $SS4_1$-$SS9_1$). In addition, the SS sets (e.g., $SS1_0$-$SS3_0$) configured with the group index 0 may be associated with at least one CORESET configured with CORESETPoolInex=0, and the SS sets (e.g., $SS4_1$-$SS9_1$) configured with the group index 1 may be associated with at least one CORESET configured with CORESET-PoolIndex=0 and 1.

The communication device may detect the PDCCH via two receiving beams RB1 and RB2 generated by two panels PLA and PLB of the communication device, respectively. The panels PLA and PLB may be corresponding to CORESET Pool Indices CPI1 and CPI2, respectively.

The communication device may receive a first indicator in a DCI (e.g., with a DCI received in a USS) from the network. The first indicator may indicate 1 which indicates the communication device to detect the PDCCH via the SS sets (e.g., the SS sets SS1-SS9) corresponding to the at least one CORESET configured with CORESEPoolIndex=0 and 1 at a time instant T1.

The communication device may receive a second indicator in a DCI (e.g., with a DCI received in a USS) from the network. The second indicator may indicate 0 which indicates the communication device to detect the PDCCH via the SS sets (e.g., the SS sets SS1-SS3) corresponding to the at least one CORESET configured with CORESEPoolIndex=0 at a time instant T2.

The operation of "determine" described above may be replaced by the operation of "compute", "calculate", "obtain", "generate", "output", "use", "choose/select", "decide" or "is configured to". The operation of "detect" described above may be replaced by the operation of "monitor", "receive", "sense" or "obtain". The term of "according to" described above may be replaced by "in response to". The phrase of "associated with" described above may be replaced by "of" or "corresponding to". The term of "via" described above may be replaced by "on", "in" or "at".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device for handling power consumption. A SS set index, a group index and an indicator are jointly considered for controlling detection of a PDCCH. Thus, the PDCCH may be detected according to various numbers of SS sets. As a result, the power consumption of the communication device can be controlled adaptively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling detection of a physical downlink (DL) control channel (PDCCH), comprising:
    at least one storage device; and
    at least one processing circuit, coupled to the at least one storage device, wherein the at least one storage device stores instructions, and the at least one processing circuit is configured to execute the instructions of:
    detecting a PDCCH for a first serving cell of a network according to at least one first search space (SS) set with a first group index;
    receiving at least one indicator in a DL control information (DCI) from the network;
    detecting the PDCCH for the first serving cell according to a predetermined SS set; and
    stopping detecting the PDCCH for the first serving cell according to the at least one third SS set except the predetermined SS set, when stopping detecting the PDCCH for the first serving cell according to the at least one third SS set for a first time period according to the at least one indicator;
    wherein the predetermined SS set comprises a common SS (CSS) set and the first time period is configured by a higher layer signal, or is indicated in the DCI.

2. The communication device of claim 1, wherein the instructions comprise:
    stopping detecting the PDCCH for the first serving cell according to at least one fourth SS set with another group index, when detecting the PDCCH for the first serving cell according to the at least one first SS set with the first group index according to the at least one indicator.

3. The communication device of claim 1, wherein the instructions comprise:
    stopping detecting the PDCCH for the first serving cell according to at least one fifth SS set with another group index, when detecting the PDCCH for the first serving cell according to the at least one second SS set with the second group index according to the at least one indicator.

4. The communication device of claim 1, wherein the first group index is configured by a higher layer signal.

5. The communication device of claim 1, wherein the instructions comprise:
    determining that a sixth group index of at least one sixth SS set is a default group index, if the at least one sixth SS set is not configured with a group index.

6. The communication device of claim 1, wherein one of the at least one first SS set is configured with the second group index.

7. The communication device of claim 1, wherein the first group index is determined according to a CORESET Pool Index for a CORESET associated with one of the at least one first SS set.

8. The communication device of claim 1, wherein the instructions comprise:
    stopping detecting the PDCCH for the first serving cell, when stopping detecting the PDCCH for the first serving cell according to the at least one third SS set for the first time period according to the at least one indicator.

9. The communication device of claim 1, wherein the communication device detects the PDCCH for the first serving cell according to the at least one second SS set with the second group index according to the at least one indicator, after a second time period after receiving the at least one indicator.

10. The communication device of claim 1, wherein the communication device stops detecting the PDCCH for the first serving cell for the first time period according to the at least one first SS set with the first group index according to the at least one indicator, after a third time period after receiving the at least one indicator.

11. The communication device of claim 1, wherein the instructions comprise:
    detecting the PDCCH for the first serving cell according to at least one seventh SS set with a default group index, when a timer expires.

12. The communication device of claim 11, wherein the instructions comprise:
    stopping detecting the PDCCH for the first serving cell according to at least one eighth SS set with another group index.

13. The communication device of claim 11, wherein a value of the default group index is 0.

14. The communication device of claim 11, wherein a value of the timer is not larger than a value of a BWP-inactivity timer for the first serving cell.

15. The communication device of claim 1, wherein the second group index is associated with an empty SS set.

16. The communication device of claim 15, wherein the instructions comprise:
    stopping a BWP-inactivity timer for the first serving cell, when detecting the PDCCH for the first serving cell according to the at least one second SS set with the second group index according to the at least one indicator.

17. The communication device of claim 15, wherein the instructions comprise:
    changing an active BWP according to expiration of a BWP-inactivity timer, wherein the active BWP is a default BWP or a dormancy BWP.

18. The communication device of claim 1, wherein the instructions comprise:
    stopping a BWP-inactivity timer for the first serving cell, when stopping detecting the PDCCH for the first serving cell for the first time period according to the at least one indicator.

19. The communication device of claim 1, wherein the instructions comprise:
    changing an active BWP according to expiration of a BWP-inactivity timer, when stopping detecting the PDCCH for the first serving cell according to the at least one third SS set for the first time period according to the at least one indicator, wherein the active BWP is a default BWP or a dormancy BWP.

20. The communication device of claim 1, wherein the first serving cell is a scheduled cell of a second serving cell configured by the network.

21. The communication device of claim 20, wherein the instructions comprise:
    detecting the PDCCH according to at least one ninth SS set for the second serving cell, wherein at least one identity of the at least one ninth SS set of the second serving cell comprises at least one identity of the at least one first SS set of the first serving cell, when detecting the PDCCH for the first serving cell according to the at least one first SS set with the first group index according to the at least one indicator.

22. The communication device of claim 20, wherein the instructions comprise:
stopping detecting the PDCCH for the second serving cell according to at least one tenth SS set for a fourth time period according to the at least one indicator.

23. The communication device of claim 22, wherein the instructions comprise:
detecting the PDCCH for the second serving cell according to a predetermined SS set; and
stopping detecting the PDCCH for the second serving cell according to the at least one tenth SS set except the predetermined SS set, when stopping detecting the PDCCH for the second serving cell according to the at least one tenth SS set for the fourth time period according to the at least one indicator.

24. The communication device of claim 22, wherein the communication device stops detecting the PDCCH for the second serving cell according to the at least one tenth SS set, after the fourth time period after receiving the at least one indicator.

25. The communication device of claim 1, wherein the at least one indicator indicates detecting the PDCCH for a plurality of serving cells comprising the first serving cell.

* * * * *